United States Patent
Del Pup et al.

(10) Patent No.: US 8,801,018 B2
(45) Date of Patent: Aug. 12, 2014

(54) WIND-UP CONTROL LINK

(71) Applicants: Brian A Del Pup, Clarkston, MI (US); Nicholas Walters, Farmington Hills, MI (US); Todd R Kelpin, Rochester, MI (US); Murthy Kowsika, Troy, MI (US)

(72) Inventors: Brian A Del Pup, Clarkston, MI (US); Nicholas Walters, Farmington Hills, MI (US); Todd R Kelpin, Rochester, MI (US); Murthy Kowsika, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/644,648

(22) Filed: Oct. 4, 2012

(65) Prior Publication Data

US 2014/0097588 A1    Apr. 10, 2014

(51) Int. Cl.
*B60G 11/04* (2006.01)

(52) U.S. Cl.
USPC ..................... 280/124.17; 267/30

(58) Field of Classification Search
USPC .............. 280/124.17, 124.174, 124.175, 280/124.116; 267/30
See application file for complete search history.

(56) References Cited

U.S. PATENT DOCUMENTS

| | | | | |
|---|---|---|---|---|
| 1,086,182 A * | 2/1914 | Jackson | ............... | 267/43 |
| 2,843,397 A * | 7/1958 | Bastow | ............... | 280/124.106 |
| 2,969,230 A * | 1/1961 | Scheublein, Jr. et al. | ..... | 267/233 |
| 3,112,014 A * | 11/1963 | Jeffries | ............... | 188/196 P |
| 3,312,459 A * | 4/1967 | Pence | ............... | 267/45 |
| 3,850,444 A * | 11/1974 | Wright et al. | ............... | 280/124.165 |
| 4,633,564 A * | 1/1987 | Sauber | ............... | 29/401.1 |
| 4,750,718 A * | 6/1988 | Nickel | ............... | 267/49 |
| 5,636,857 A * | 6/1997 | Tandy et al. | ............... | 280/124.165 |
| 6,371,466 B1 * | 4/2002 | Spears | ............... | 267/265 |
| 7,581,741 B2 * | 9/2009 | Reineck | ............... | 280/124.17 |
| 2009/0085318 A1 | 4/2009 | Guthrie | | |
| 2011/0140388 A1 | 6/2011 | Juriga | | |

* cited by examiner

*Primary Examiner* — Paul N Dickson
*Assistant Examiner* — Timothy Wilhelm
(74) *Attorney, Agent, or Firm* — Ralph E Smith

(57) ABSTRACT

A vehicle suspension may include a leaf spring, a link member and a bumper. The leaf spring may include first and second ends and a body extending between the first and second ends. The first end may be pivotably coupled to a first mounting structure and may be configured to pivot relative to a vehicle chassis. The second end may be pivotably coupled to a second mounting structure and may be configured to pivot relative to the vehicle chassis. The body may engage a third mounting structure configured to secure the body relative to a vehicle axle. The link member may include a first end pivotably coupled to the first mounting structure and a second end pivotably coupled to the third mounting structure. The bumper may extend downward from the link member toward the leaf spring.

19 Claims, 5 Drawing Sheets

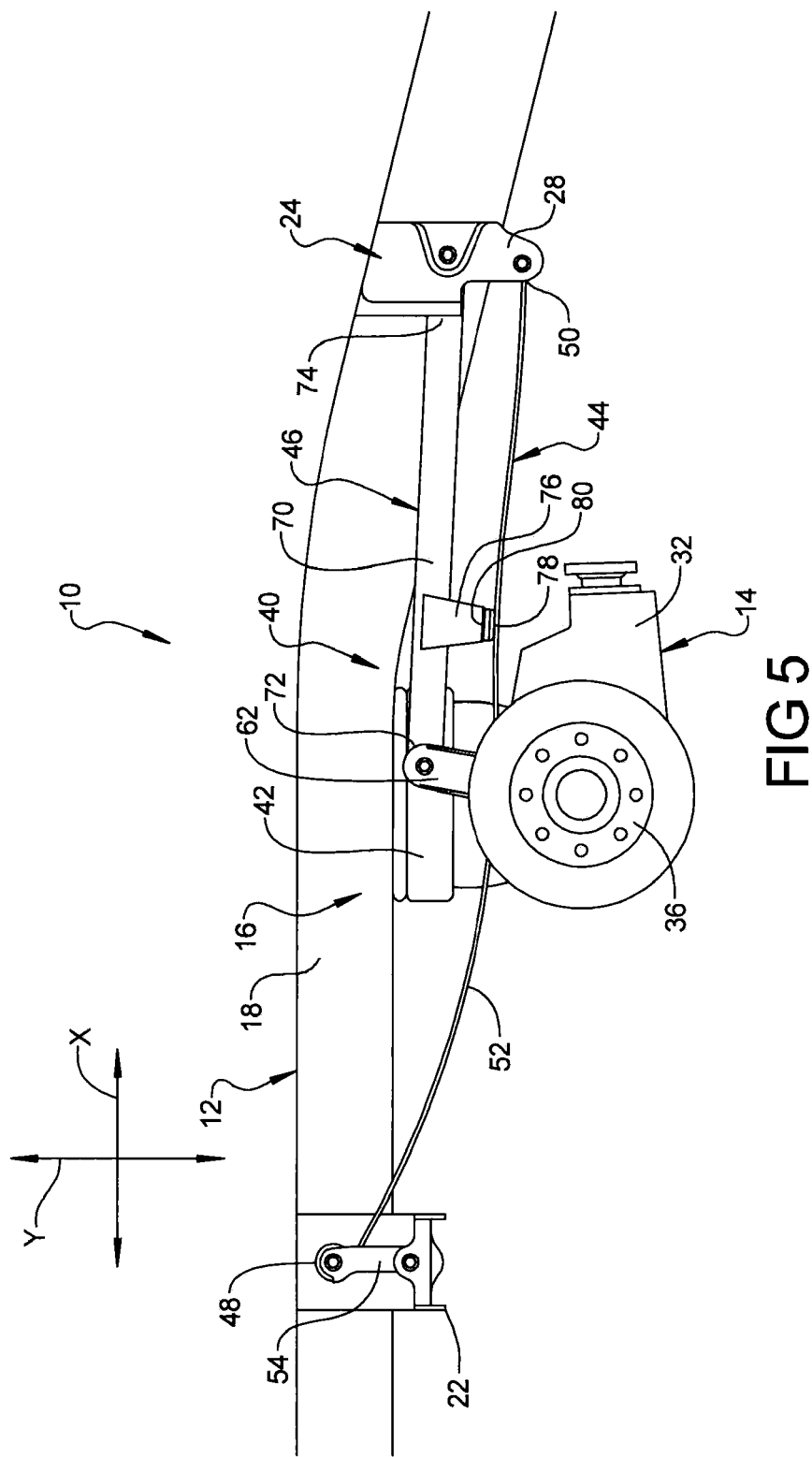

WIND-UP CONTROL LINK

FIELD

The present disclosure relates to a wind-up control link for a vehicle suspension.

BACKGROUND

Vehicles include a suspension system to isolate a chassis of the vehicle from road noise, bumps and vibration while providing sufficient road-holding ability for adequate handling and braking. A conventional vehicle suspension may include leaf spring stacks attached to corresponding ends of an axle. The spring rates of the leaf spring stacks determine the stiffness of the suspension system in the vertical, lateral, fore/aft and torsional (wind-up) directions, and therefore, control movement of the axle in these directions relative to the chassis.

SUMMARY

The present disclosure provides a vehicle suspension that may include a leaf spring, a link member and a bumper. The leaf spring may include first and second ends and a body extending between the first and second ends. The first end may be pivotably coupled to a first mounting structure and may be configured to pivot relative to a vehicle chassis. The second end may be pivotably coupled to a second mounting structure and may be configured to pivot relative to the vehicle chassis. The body may engage a third mounting structure configured to secure the body relative to a vehicle axle. The link member may include a first end pivotably coupled to the first mounting structure and a second end pivotably coupled to the third mounting structure. The bumper may extend downward from the link member toward the leaf spring.

In some embodiments, the bumper may include a proximal end attached to the link member and a distal end spaced apart from the link member.

In some embodiments, the distal end may be spaced apart from the leaf spring when the vehicle suspension is in a rest state.

In some embodiments, the distal end may be spaced apart from the leaf spring when the vehicle suspension is in a vertically compressed state and a velocity of a vehicle in which the vehicle suspension is installed is constant or changing at a rate that is lower than a predetermined rate.

In some embodiments, the distal end may be in contact with the leaf spring when an acceleration of a vehicle in which the vehicle suspension is installed is at an absolute value greater than a predetermined value.

In some embodiments, contact between the distal end and the leaf spring limits deformation of the leaf spring during vehicle acceleration.

In some embodiments, the vehicle suspension may also include an air spring coupled to the vehicle chassis and the vehicle axle. The air spring may be compressed when the vehicle suspension is in the vertically compressed state.

In some embodiments, the bumper may be disposed on the body of the link member at a location that is closer to the second end of the link member than the first end of the link member.

In some embodiments, the link member may be substantially rigid and may be substantially undeflected when the vehicle suspension is in a vertically compressed state and a velocity of a vehicle in which the vehicle suspension is installed is constant or changing at a rate that is lower than a predetermined rate.

In some embodiments, a body of the bumper may be substantially rigid and a distal end of the bumper includes a resiliently compressible pad.

In another form, the present disclosure provides a vehicle suspension that may include a resiliently deflectable leaf spring and a substantially rigid link member. The leaf spring may include first and second ends and a body extending between the first and second ends. The first end may be configured to be mounted to a vehicle chassis. The second end may be configured to be mounted to the vehicle chassis. The body may engage a mounting bracket configured to secure the body relative to a vehicle axle. The link member may include a first end pivotably coupled to the mounting bracket, a second end pivotably coupled to the vehicle chassis, and a body extending between the first and second ends.

In some embodiments, the link member is disposed above the leaf spring. That is, the leaf spring may be disposed between the link member and a ground surface upon which the vehicle is disposed.

In some embodiments, the link member may be disposed above the leaf spring.

In some embodiments, the vehicle suspension may include a bumper extending from the link member toward the leaf spring.

In some embodiments, a distal end of the bumper may be spaced apart from the leaf spring when the vehicle suspension is in a rest state.

In some embodiments, the distal end may be spaced apart from the leaf spring when the vehicle suspension is in a vertically compressed state and a velocity of a vehicle in which the vehicle suspension is installed is constant or changing at a rate that is lower than a predetermined rate.

In some embodiments, the distal end may be in contact with the leaf spring when an acceleration of a vehicle in which the vehicle suspension is installed is at an absolute value greater than a predetermined value, and wherein contact between the distal end and the leaf spring limits deformation of the leaf spring during vehicle acceleration.

In some embodiments, the bumper may be disposed on the body of the link member at a location that is closer to the second end of the link member than the first end of the link member.

In some embodiments, a body of the bumper may be substantially rigid.

In some embodiments, a distal end of the bumper may include a resiliently compressible pad.

In some embodiments, the link member may be substantially undeflected when the vehicle suspension is in a vertically compressed state and a velocity of a vehicle in which the vehicle suspension is installed is constant or changing at a rate that is lower than a predetermined rate.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 5 is a side view of the suspension system and chassis in a wound-up state according to the principles of the present disclosure.

DETAILED DESCRIPTION

Figure 1:
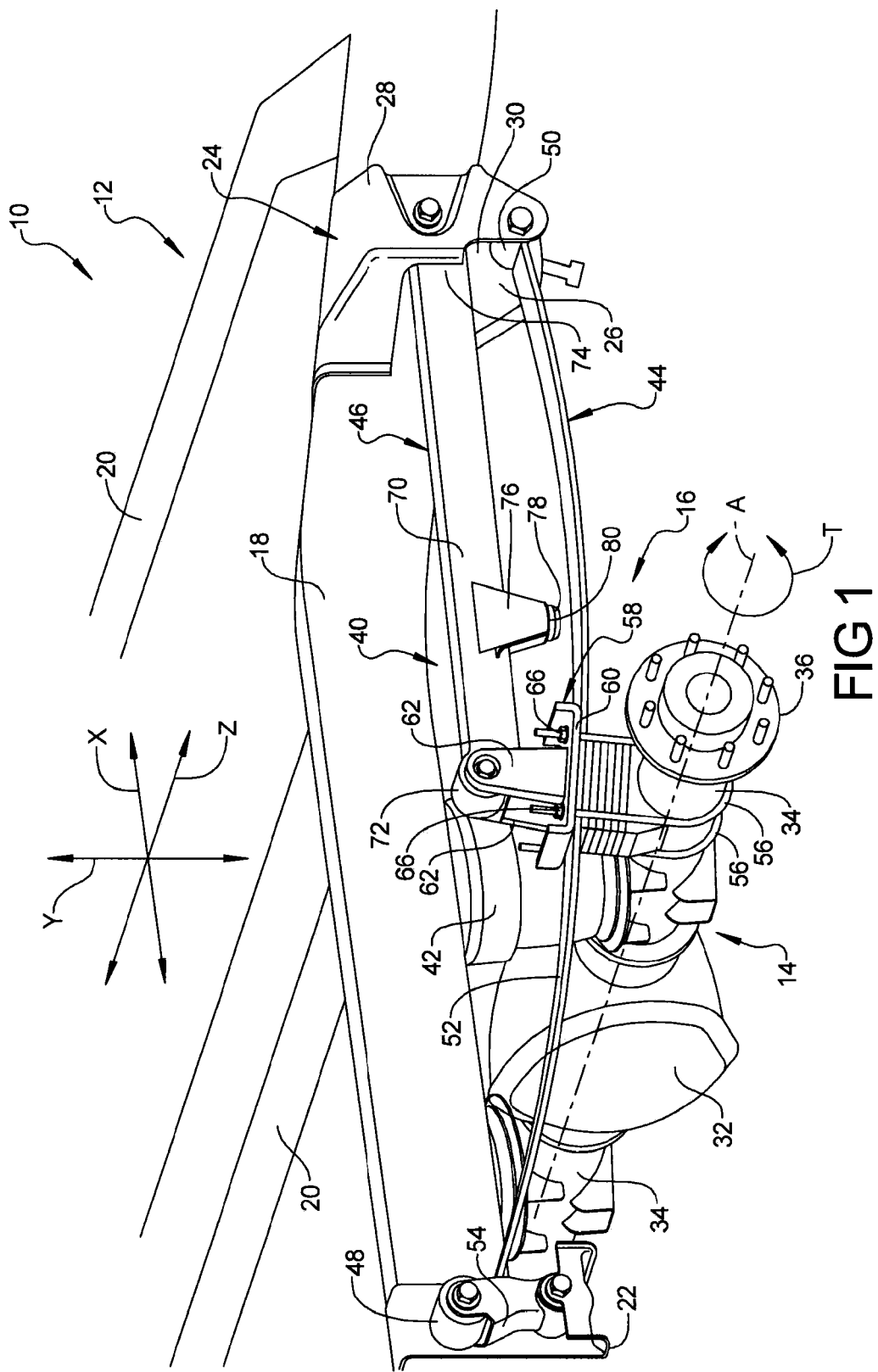
FIG. 1 is a partial perspective view of a vehicle having a chassis and a suspension system according to the principles of the present disclosure.

In an exemplary embodiment and with reference to FIG. 1, a vehicle 10 is provided that may include a chassis 12, an axle assembly 14 and a suspension system 16. The suspension system 16 may couple the axle assembly 14 to the chassis 12 and may isolate the chassis 12 from road noise, bumps, and vibrations. As will be subsequently described, the suspension system 16 may control motion of the axle assembly 14 (or components of the axle assembly 14) relative to the chassis 12 in a vertical direction (i.e., direction Y), a fore/aft direction (i.e., direction X), a lateral direction (i.e., direction Z), and a torsional direction (i.e., rotation in direction T about axis A), while maximizing or improving vehicle ground clearance and packaging of the suspension system 16.

The chassis 12 may include a pair of generally parallel rails 18 (only one of which is shown in the figures) and a plurality of cross-members 20. The rails 18 may extend generally in the fore/aft direction X and may be connected to each other by the cross-members 20. It will be appreciated that the rails 18 and cross-members 20 can be configured in any desired manner to suit a given application. It will also be appreciated that the chassis 12 could include additional or alternative structural members to support components and/or subsystems of the vehicle 10.

Each rail 18 may include a first flange or bracket 22 and a second flange or bracket 24. In the particular example provided, the first bracket 22 is a generally L-shaped member that may be welded or otherwise fixed to the rail 18. The first bracket 22 may be disposed closer to a rear end of the vehicle 10 than the second bracket 24. As shown in FIG. 1, the second bracket 24 may include inner and outer members 26, 28 extending from the rail 18 and may define a space 30 therebetween. The first and second brackets 22, 24 may support one or more components of the suspension system 16, as will be described in more detail below.

The axle assembly 14 may be a rear axle assembly, such as a Salisbury axle assembly, for example. The axle assembly 14 may include a differential assembly 32, a pair of axle tubes 34 having axle shafts (not shown) disposed therein. The axle shafts may receive rotary power from a propshaft (not shown) via a gearset (not shown) of the differential assembly 32 and are rotatable about the axis A. The axle shafts may be connected to wheel hubs 36 (only one of which is shown in the figures). It will be appreciated that the axle assembly 14 could be any other type of axle assembly. In other embodiments, the axle assembly 14 could be a front axle assembly.

Referring now to FIGS. 1-5, the suspension system 16 may be a rear suspension system and may include a pair of suspension subsystems 40 (only one of which is shown in the figures). Each suspension subsystem 40 corresponds to a particular one of the axle shafts and wheel hubs 36 of the axle assembly 14. It will be appreciated that the structure and function of the suspension subsystems 40 may be substantially identical to each other.

Figure 4:
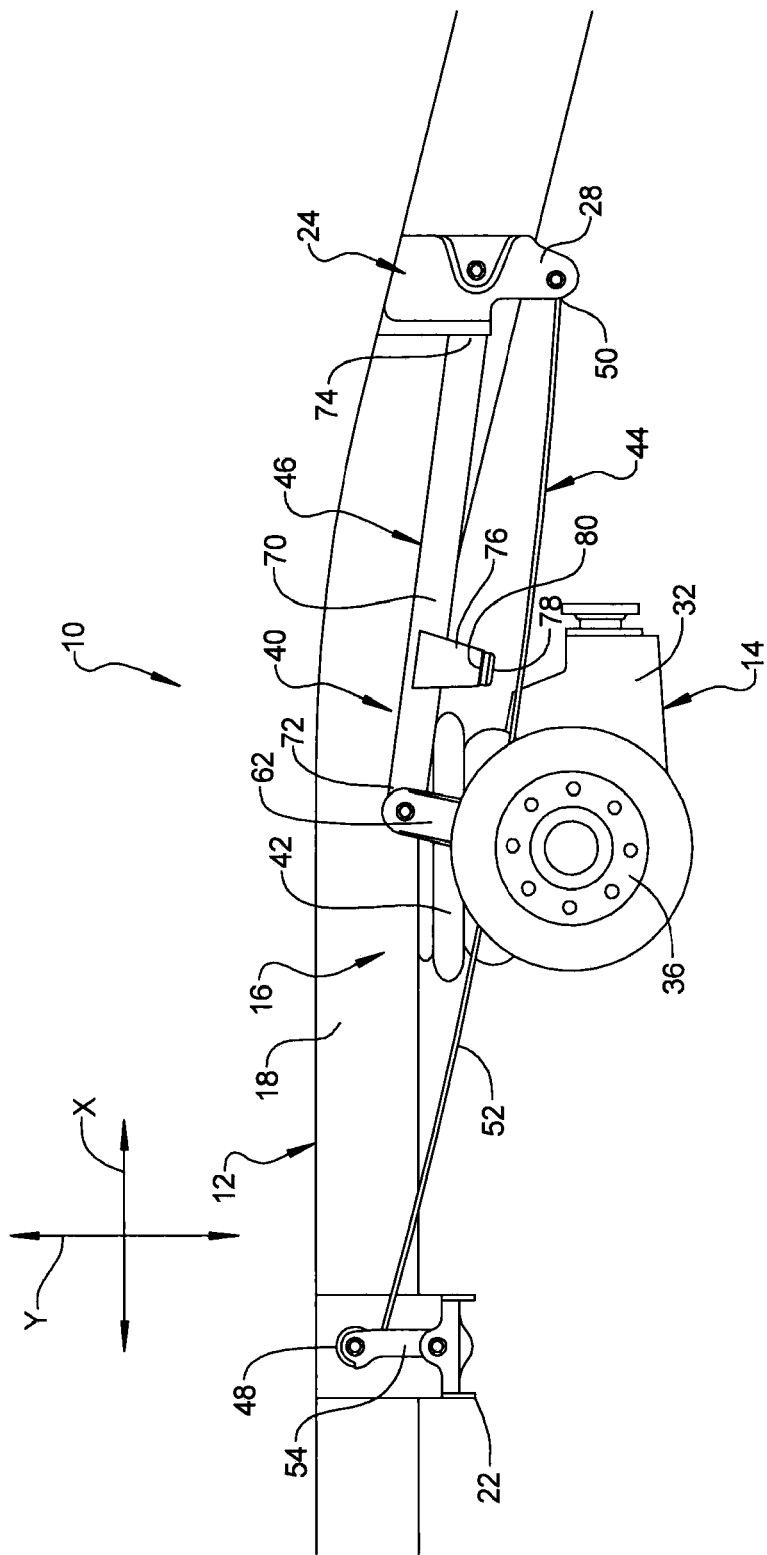
FIG. 4 is a side view of the suspension system and chassis in a vertically compressed state according to the principles of the present disclosure.

Each suspension subsystem 40 may include an air spring 42, one or more leaf springs 44, and a link member 46. The air spring 42 may be attached to a corresponding one of the axle tubes 34 and the cross-member 20, rail 18 or other component of the chassis 12. The air spring 42 may provide a majority or nearly all of a vertical spring rate of the suspension subsystem 40. As shown in FIG. 4, the air spring 42 is resiliently compressible to allow damped movement of the axle assembly 14 in the vertical direction Y relative to the chassis 12. It will be appreciated that each suspension subsystem 40 could include other types of springs or dampers (such as a coil spring or a hydraulic damper, for example) in addition to or in the alternative to the air spring 42.

The leaf spring 44 may be a resiliently deflectable member having first and second ends 48, 50 and a body 52 extending between the first and second ends 48, 50. The first end 48 may be pivotably connected to a link 54, which in turn, may be connected to the first bracket 22. The second end 50 may be received between and pivotably connected to the inner and outer members 26, 28 of the second bracket 24. It will be appreciated that any other suitable mounting arrangement may be employed to mount the leaf spring 44 to the chassis 12 such that the first and second ends 48, 50 are pivotable relative to the chassis 12.

Figure 2:
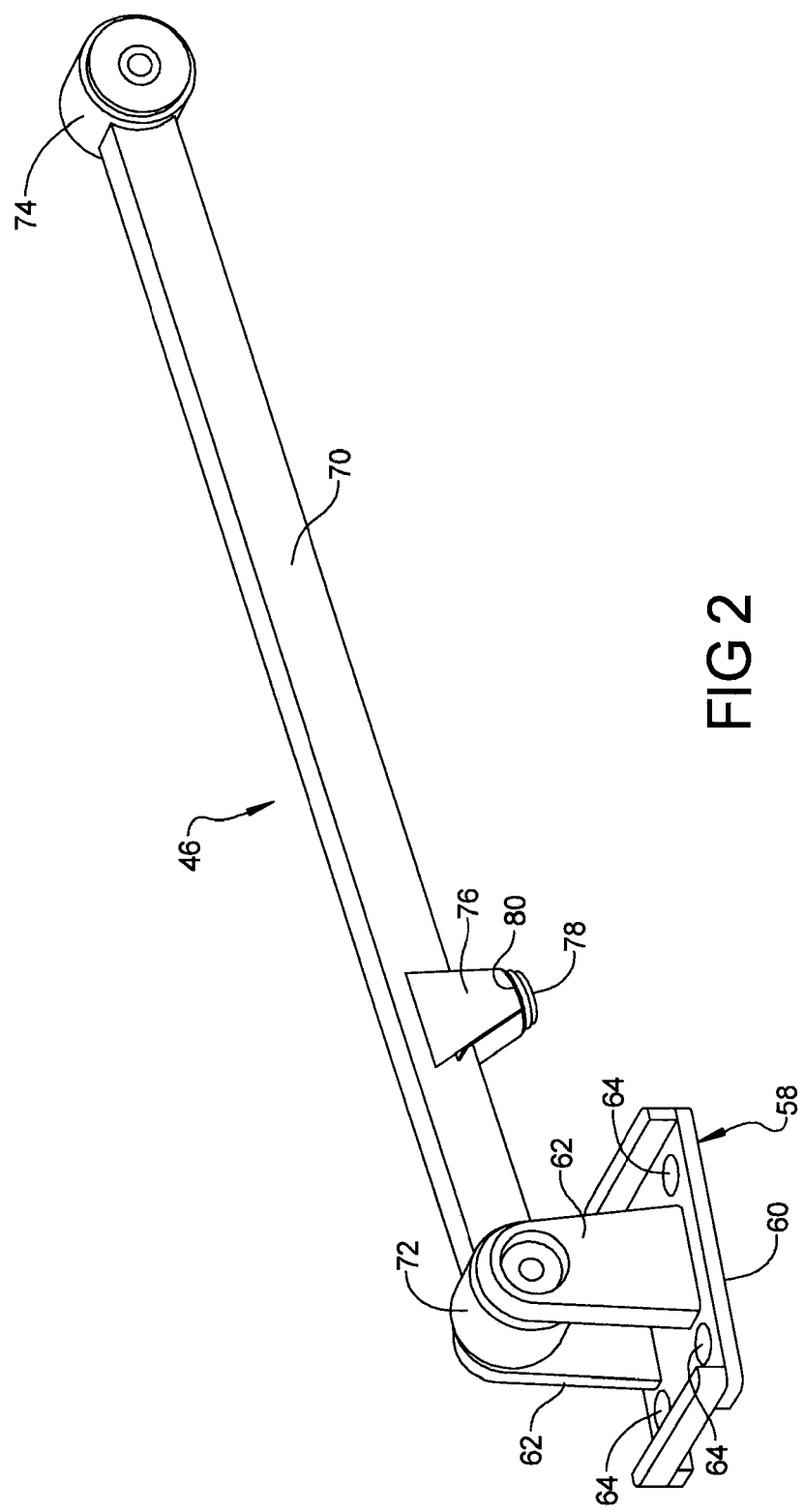
FIG. 2 is a perspective view of a wind-up control link and mounting bracket of the suspension system of FIG. 1.
Figure 3:
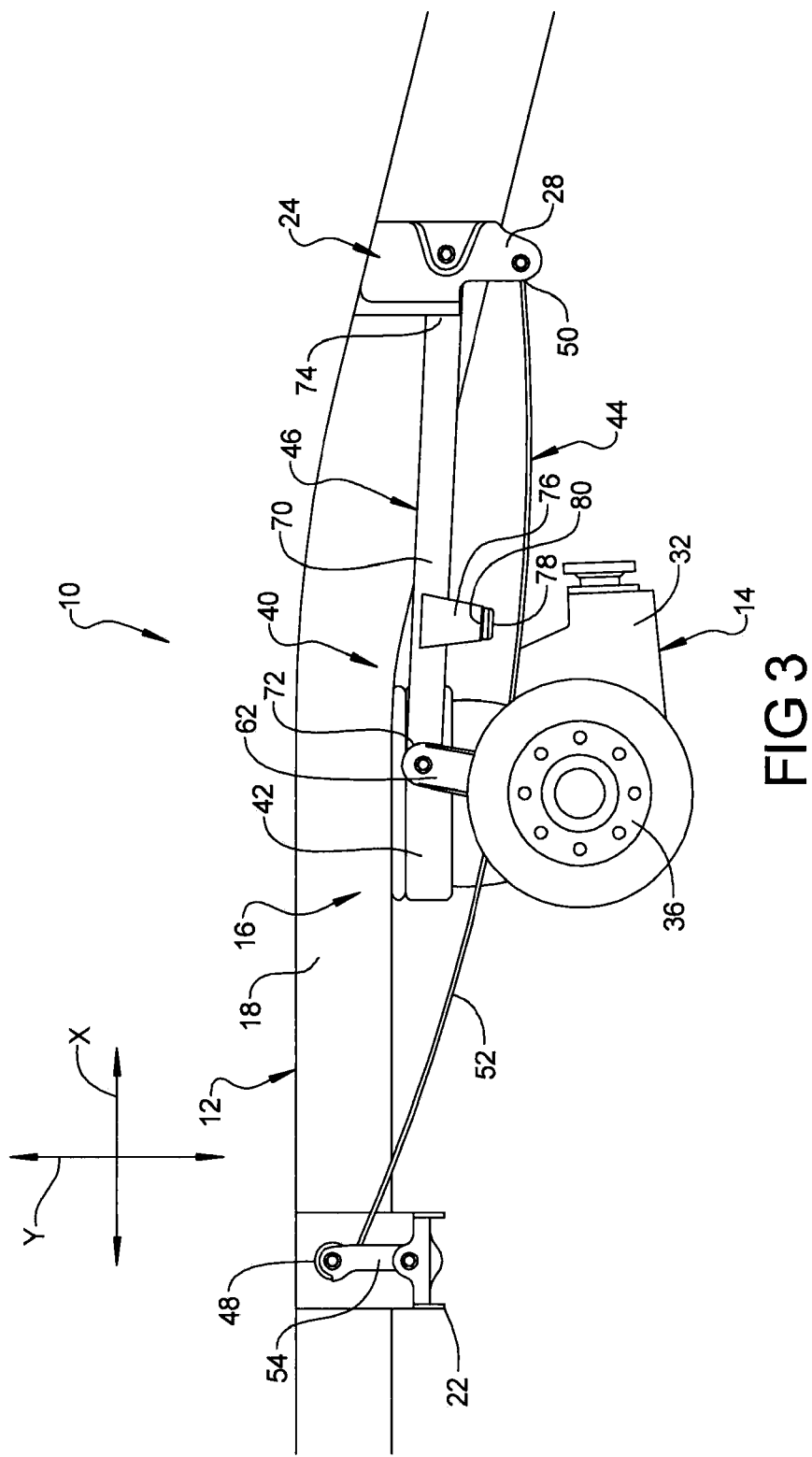
FIG. 3 is a side view of the suspension system and chassis in a rest state according to the principles of the present disclosure.

The body 52 of the leaf spring 44 may be connected to the corresponding axle tube 34 by one or more U-bolts 56 (FIG. 1) and a bracket 58. As shown in FIGS. 1 and 2, the bracket 58 may include a base 60 and a pair of support members 62 extending upward from the base 60. The base 60 may include a plurality of apertures 64 (FIG. 2) extending therethrough. As shown in FIG. 1, the U-bolts 56 may straddle the axle tube 34 and the body 52 of the leaf spring 44 and extend through apertures 64 (FIG. 2) in the base 60 of the bracket 58. Nuts 66 (FIG. 1) may threadably engage ends of the U-bolts 56 and clamp the bracket 58 and leaf spring 44 to the axle tube 34. While the suspension subsystem 40 is shown in the figures as having a single leaf spring 44, in some embodiments, each subsystem 40 may include a plurality of leaf springs 44 stacked upon each other.

The link member 46 may include a substantially rigid body 70 having a first end 72 and a second end 74. The link member 46 may be disposed above the leaf spring 44 (i.e., the leaf spring 44 may be between the link member 46 and a ground surface upon which the vehicle 10 is disposed) to improve ground clearance. Likewise, arranging the leaf spring 44 above the axle tube 34 also improves ground clearance.

The body 70 of the link member 46 can be formed from a rigid, solid metallic bar or rigid, structural metallic tubing, for example. A rigid bumper 76 may extend downward from the body 70 toward the leaf spring 44. The bumper 76 can be welded to the body 70 or otherwise attached thereto. In some embodiments, the bumper 76 could be integrally formed with the link member 46 via casting and/or machining processes, for example. The bumper 76 may extend generally orthogonally from the body 70 and may be disposed at any suitable location along the length of the body 70. In the particular example illustrated in the figures, the bumper 76 is disposed closer to the first end 72 than the second end 74 (i.e., closer to the aft end of the link member 46 than the forward end of the link member 46). A resiliently compressible pad 78 may be attached to a distal end 80 of the bumper 76. The pad 78 can be formed from a natural or synthetic rubber or a compressible polymeric material, for example, and may reduce noise and wear due to contact between the bumper 76 and the leaf spring 44. In some embodiments, the bumper 76 may extend downward from the body 70 at a non-perpendicular angle so that the compressible pad 78 can effectively engage the leaf spring 44 when the leaf spring 44 is in a deformed condition during acceleration of the vehicle 10.

The first end 72 of the link member 46 may be pivotably coupled to the support members 62 of the bracket 58. The second end 74 may be received between and pivotably coupled to the inner and outer members 26, 28 of the second bracket 24. In this manner, the link member 46 may be pivotable relative to the leaf spring 44 and relative to the chassis 12.

With reference to FIGS. 1 and 3-5, operation of the suspension system 16 will be described in detail. As described above, a vertical spring rate of the suspension system 16 is primarily controlled by the air springs 42. That is, the air springs 42 provide the majority of the restraining force in the vertical direction Y, and the leaf springs 44 provide some additional restraining force in the vertical direction Y, albeit a relatively small amount. The leaf springs 44 may provide a majority of the restraining force in the fore/aft direction X and in the lateral direction Z (FIG. 1).

The vertical spring rate of the leaf springs 44 may be minimized or reduced compared to a leaf spring stack of a conventional Hotchkiss rear suspension to allow a majority of the vertical spring rate of the suspension system 16 to be provided by the air springs 42. In prior-art suspension systems, such a reduced leaf-spring-rate may adversely affect wind-up control of an axle assembly, and leaf-spring-deformation may be unacceptably high in such systems during vehicle acceleration. In the suspension system 16 of the present disclosure, the link members 46 may supplement the wind-up control provided by the leaf springs 44 and may limit deformation of the leaf springs 44 due to wind-up.

When the suspension system 16 is in a nominal or resting state (shown in FIG. 3), the pad 78 on the distal end 80 of the bumper 76 may be spaced apart from the leaf spring 44. As shown in FIG. 4, when the suspension system 16 is in a substantially vertically compressed state (i.e., when the air springs 42 are compressed in the vertical direction Y and the vehicle 10 is undergoing relatively little or no acceleration), the bumper 76 remains spaced apart from the leaf spring 44 and does not limit deflection of the leaf spring 44 or otherwise significantly contribute to the vertical spring rate of the suspension system 16. Furthermore, the link member 46 may remain substantially undeflected or uncompressed when the suspension system 16 is in the substantially vertically compressed state.

As shown in FIG. 5, when the vehicle 10 is experiencing a relatively large acceleration (i.e., either increasing or decreasing its speed), the axle assembly 14 may experience a relatively large wind-up force about axis A in direction T. Wind-up forces may tend to deform the leaf spring 44 into a generally S-shape, as shown in FIG. 5. The bumper 76 on the link member 46 may be positioned such that when wind-up forces reach a predetermined level, the leaf spring 44 will come into contact with the bumper 76, such that the bumper 76 may limit the amount of deformation of the leaf spring 44 due to wind-up. Furthermore, the rigidity of the link member 46 may also supplement the ability of the leaf spring 44 to resist wind-up forces. In this manner, the link member 46 and the leaf spring 44 may cooperate to provide adequate wind-up control while allowing the vertical spring rate to be determined primarily by the air spring 42.

What is claimed is:

1. A vehicle suspension comprising:
a leaf spring having first and second ends and a body extending between the first and second ends, the first end pivotably coupled to a first mounting structure and configured to pivot relative to a vehicle chassis, the second end pivotably coupled to a second mounting structure and configured to pivot relative to the vehicle chassis, the body engaging a third mounting structure configured to secure the body relative to a vehicle axle;
a link member having a first end pivotably coupled to the first mounting structure and a second end pivotably coupled to the third mounting structure; and
a bumper extending downward from the link member toward the leaf spring.

2. The vehicle suspension of claim 1, wherein the bumper includes a proximal end attached to the link member and a distal end spaced apart from the link member.

3. The vehicle suspension of claim 2, wherein the distal end is spaced apart from the leaf spring when the vehicle suspension is in a rest state.

4. The vehicle suspension of claim 3, wherein the distal end is spaced apart from the leaf spring when the vehicle suspension is in a vertically compressed state and a velocity of a vehicle in which the vehicle suspension is installed is constant or changing at a rate that is lower than a predetermined rate.

5. The vehicle suspension of claim 4, wherein the distal end is in contact with the leaf spring when an acceleration of a vehicle in which the vehicle suspension is installed is at an absolute value greater than a predetermined value.

6. The vehicle suspension of claim 5, wherein contact between the distal end and the leaf spring limits deformation of the leaf spring during vehicle acceleration.

7. The vehicle suspension of claim 6, further comprising an air spring coupled to the vehicle chassis and the vehicle axle, the air spring compressing when the vehicle suspension is in the vertically compressed state.

8. The vehicle suspension of claim 1, wherein the bumper is disposed on a body of the link member at a location that is closer to the second end of the link member than the first end of the link member.

9. The vehicle suspension of claim 1, wherein the link member is substantially rigid and is substantially undeflected when the vehicle suspension is in a vertically compressed state and a velocity of a vehicle in which the vehicle suspension is installed is constant or changing at a rate that is lower than a predetermined rate.

10. The vehicle suspension of claim 1, wherein a body of the bumper is substantially rigid and a distal end of the bumper includes a resiliently compressible pad.

11. A vehicle suspension comprising:
a resiliently deflectable leaf spring having first and second ends and a body extending between the first and second ends, the first end configured to be mounted to a vehicle chassis, the second end configured to be mounted to the vehicle chassis, the body engaging a mounting bracket configured to secure the body relative to a vehicle axle;
a substantially rigid link member including a first end pivotably coupled to the mounting bracket, a second end pivotably coupled to the vehicle chassis, and a body extending between the first and second ends; and
a bumper extending from the link member toward the leaf spring.

12. The vehicle suspension of claim 11, wherein the link member is disposed above the leaf spring.

13. The vehicle suspension of claim 11, wherein a distal end of the bumper is spaced apart from the leaf spring when the vehicle suspension is in a rest state.

14. The vehicle suspension of claim 13, wherein the distal end is spaced apart from the leaf spring when the vehicle suspension is in a vertically compressed state and a velocity of a vehicle in which the vehicle suspension is installed is constant or changing at a rate that is lower than a predetermined rate.

15. The vehicle suspension of claim 14, wherein the distal end is in contact with the leaf spring when an acceleration of a vehicle in which the vehicle suspension is installed is at an absolute value greater than a predetermined value, and wherein contact between the distal end and the leaf spring limits deformation of the leaf spring during vehicle acceleration.

16. The vehicle suspension of claim 11, wherein the bumper is disposed on the body of the link member at a location that is closer to the second end of the link member than the first end of the link member.

17. The vehicle suspension of claim 11, wherein a body of the bumper is substantially rigid.

18. The vehicle suspension of claim 17, wherein a distal end of the bumper includes a resiliently compressible pad.

19. The vehicle suspension of claim 11, wherein the link member is substantially undeflected when the vehicle suspension is in a vertically compressed state and a velocity of a vehicle in which the vehicle suspension is installed is constant or changing at a rate that is lower than a predetermined rate.

\* \* \* \* \*